United States Patent [19]

Pavlecka

[11] 4,402,475
[45] Sep. 6, 1983

[54] THRUSTERS FOR AIRSHIP CONTROL

[75] Inventor: Vladimir H. Pavlecka, Newport Beach, Calif.

[73] Assignee: Airships International, Inc., Tustin, Calif.

[21] Appl. No.: 151,659

[22] Filed: May 20, 1980

Related U.S. Application Data

[63] Continuation of Ser. No. 952,783, Oct. 19, 1978, abandoned.

[51] Int. Cl.³ .............................................. B64B 1/26
[52] U.S. Cl. ...................................... 244/96; 244/52; 244/69; 244/29; 416/128; 440/40
[58] Field of Search ................ 244/23 R, 23 A, 23 C, 244/29, 96, 52, 69, 24, 73 R, 51, 15; 440/40; 114/151, 337, 330, 338; 416/128, 129, DIG. 4, 170 R; 415/68, 69

[56] References Cited

U.S. PATENT DOCUMENTS

| | | | |
|---|---|---|---|
| 988,697 | 4/1911 | D'Antonio | 440/40 |
| 1,337,409 | 4/1920 | Ochs | 244/29 |
| 1,457,024 | 5/1923 | Franzen | 244/29 |
| 1,677,688 | 7/1928 | Rees | 244/29 |
| 2,080,094 | 5/1937 | Rusch | 244/96 |
| 2,121,073 | 6/1938 | Bothezat | 415/69 |
| 2,214,656 | 9/1940 | Briggs | 244/52 |
| 2,475,786 | 7/1949 | Jordan | 244/73 R |
| 2,477,637 | 8/1949 | Mercier | 244/15 |
| 2,494,368 | 1/1950 | Steele et al. | 244/69 |
| 3,127,132 | 3/1964 | Grady | 244/55 |
| 3,346,216 | 10/1967 | Desmarteau | 244/30 |
| 3,620,485 | 11/1971 | Gelhard | 244/29 |
| 3,811,791 | 5/1974 | Cotton | 416/129 |

FOREIGN PATENT DOCUMENTS

| | | | |
|---|---|---|---|
| 2043916 | 3/1972 | Fed. Rep. of Germany | 244/29 |
| 2548991 | 5/1977 | Fed. Rep. of Germany | 244/29 |
| 1293654 | 4/1962 | France | 244/52 |
| 1147504 | 4/1969 | United Kingdom . | |

Primary Examiner—Galen L. Barefoot
Attorney, Agent, or Firm—Christie, Parker & Hale

[57] ABSTRACT

The use of thrusters at the bow and stern of an airship for control of the direction, attitude, and orientation of such an airship is described. The thruster utilizes an electric motor or a gas turbine for power. In the electric motor embodiment, the motor utilizes two contra-rotating rotors which each drive a separate and contra-rotating propeller to generate the controlling jet of air. Thrusters are arranged in pairs at the top, bottom, and each side of the bow and stern of the airship. Lifting thrusters directed downwardly and located above the longitudinal extent of the hull are provided to augment the static lift capability of the airship when under heavy load.

13 Claims, 9 Drawing Figures

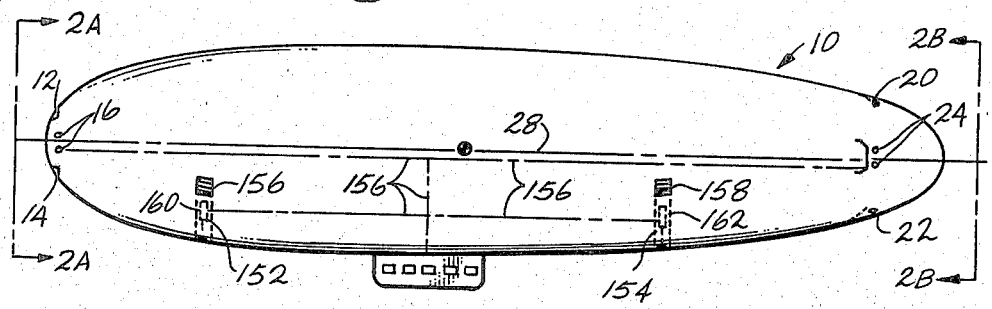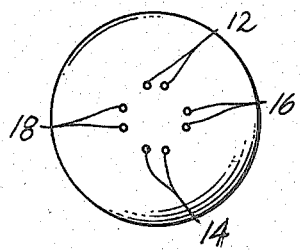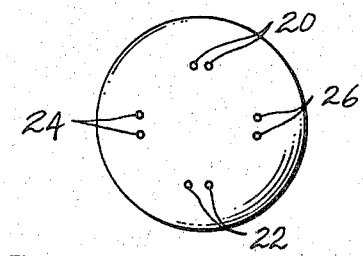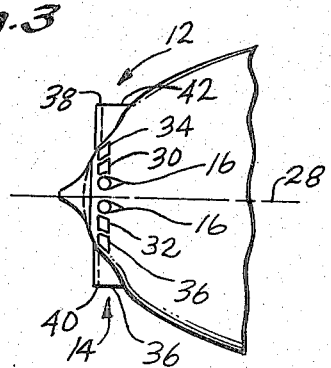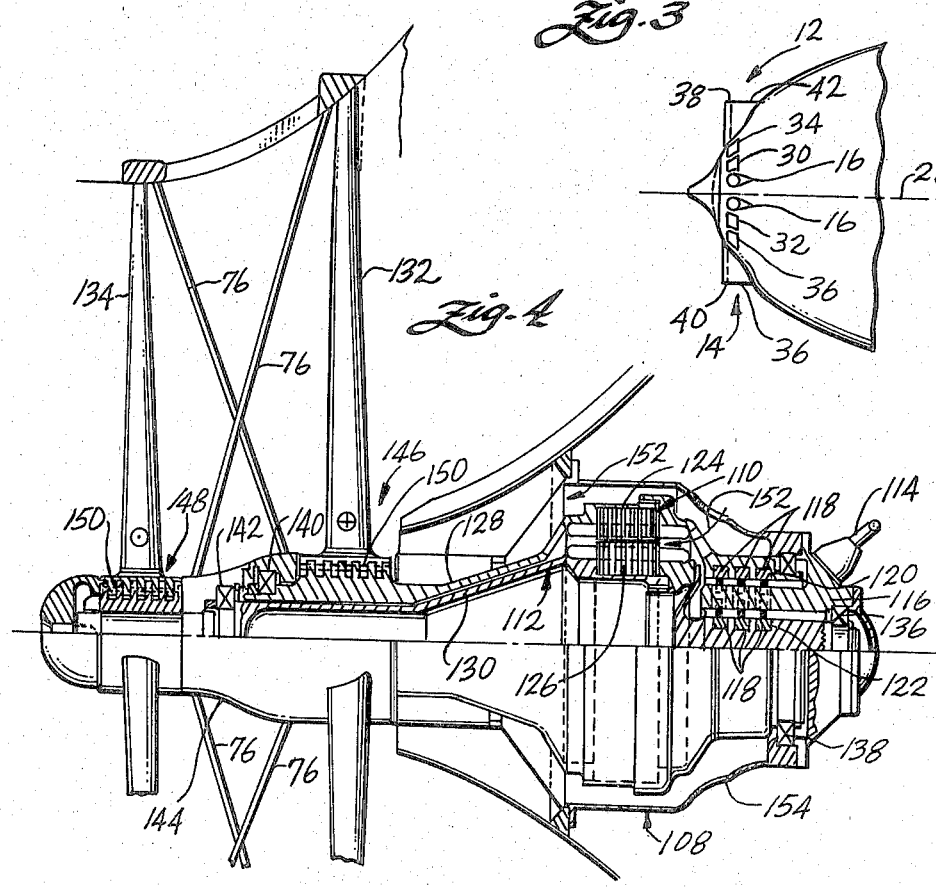

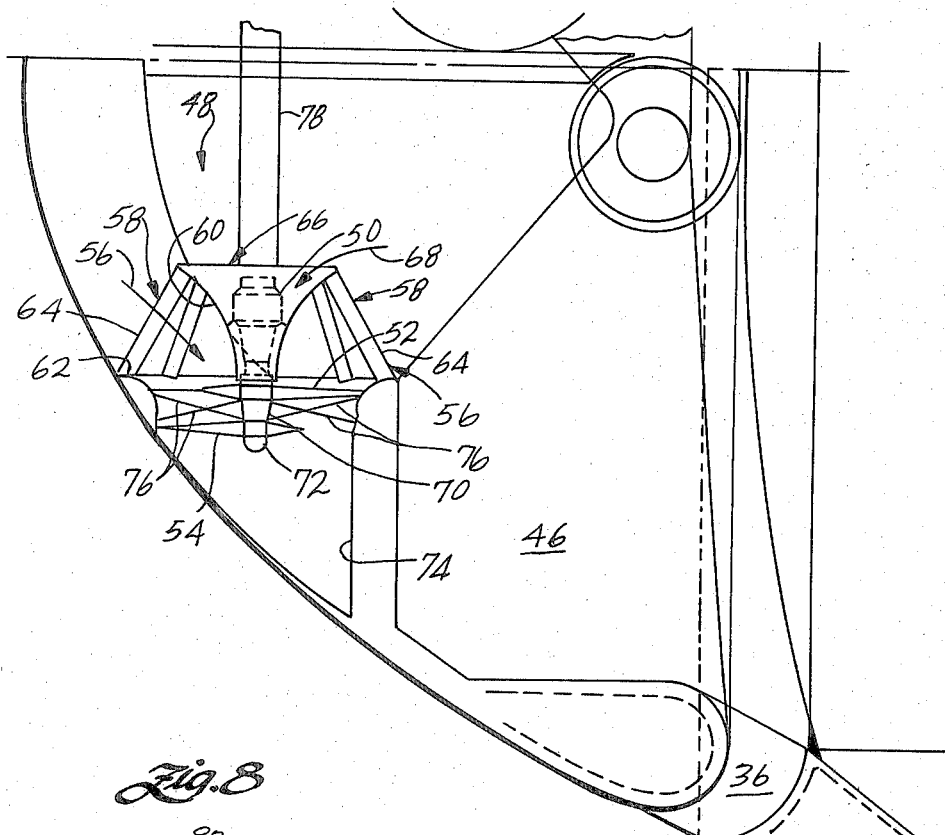
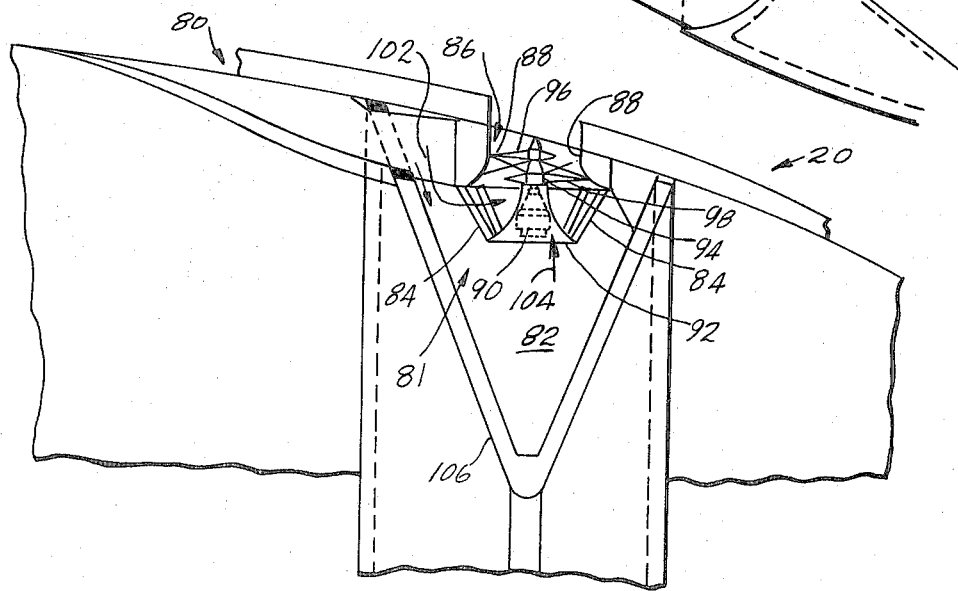

THRUSTERS FOR AIRSHIP CONTROL

This is a continuation of application Ser. No. 952,783 filed Oct. 19, 1978, now abandoned.

CROSS-REFERENCE TO RELATED APPLICATIONS

This application is related to the following companion applications directed to various aspects of metal-clad airships:

Ser. No. 932,223, filed Aug. 9, 1978 and entitled "Gradation of Skin Thickness of Metal-Clad Airship Hulls" and now U.S. Pat. No. 4,208,027;

Ser. No. 932,131, filed Aug. 9, 1978, now abandoned and entitled "Apparatus for Attaching Fabric to Walls";

Ser. No. 932,222, filed Aug. 9, 1978, now abandoned and entitled "Gas Cells for Metal-Clad Airships";

Ser. No. 932,286, filed Aug. 9, 1978, and entitled "Method of Assembly of Airship Hull" now U.S. Pat. No. 4,259,776; and Ser. No. 932,221, filed Aug. 9, 1978, now abandoned and entitled "Metal-Clad Airship Hull Construction".

The subject matter and the disclosure of the foregoing applications are incorporated herein by reference.

FIELD OF THE INVENTION

The present invention relates to airships and, in particular, to the use of thrusters to control the movement of such airships.

BACKGROUND OF THE INVENTION

Historically, large airships have been characterized by a complete lack of control at low speeds and when standing still before attachment of the ship to a mooring tower. Conventional fins and movable surfaces did not provide adequate control even at elevated speeds because the controls were always too slow in response.

The concept of controlling airships by the momentum force of jets or thrusters is one which was first proposed by Forlanini, a designer of semi-rigid airships in the early part of the 20th century. Forlanini built a small airship which was controlled in all directions by a central blower from which air was ducted to the stern and the bow of the ship and there released in jets of air by valving at appropriate times. Control by this means was sufficiently effective to allow the airship to be maneuvered into the hanger without the help of a ground crew. The use of a central blower as the source of jet air is, however too cumbersome and heavy for use in airships, particularly large airships.

Conventional control arrangements and mechanisms are also unsatisfactory for efficient operation of airships, particularly metal-clad airships. Such orthodox control surfaces are harmful to airship performance and, particularly are incapable of providing fully dependable and effective control of the ship at all speeds from zero speed forward to maximum. They are, likewise, essentially totally ineffective in controlling the airship in turbulent weather, lacking as they do, dependability and responsiveness

SUMMARY OF THE INVENTION

The present invention provides for the use of thrusters to control the flight of airships, particularly rigid metal-clad airships. The incorporation of thrusters into the design of such ships serves two particular purposes. The first is to provide controls which are efficient and effective and completely replace the fins and movable surfaces of conventional airships, eliminating the inadequacy of their control as well as the weight and drag of such control surfaces. Thrusters of a specific design are also provided for augmenting the static lift of an airship whenever this is required. Such lift thrusters are capable of long duration operation and are driven either directly by a gas turbine engine or by electric motors which are energized from a central power plant. In the presently preferred embodiment, control and lift thrusters are driven by a contra-rotating asynchronous electric motor.

In one aspect, the invention provides an airship comprising a hull having a bow and a stern. First thruster means are located at the bow of the hull for influencing the attitude of the front end of the airship and second thruster means are located at the stern for influencing the attitude of the rear end of the airship. Control means are connected between an operation's control station and the first and second thruster means for controlling the operation of the thrusters.

In another aspect, the invention provides a thruster for controlling the direction of motion of an airship comprising motor means mounted interiorly of the airship. Propeller means is located within the airship mounted on a shaft extending from the motor means. Air intake means open into the interior of the airship for communicating air to the propellers. Air exit means communicate between the propeller means and the exterior of the airship for directing a control jet of air away from the airship.

An airship hull in forward motion is normally unstable. stable. This necessitates the provision of continuous corrections for deviations from a fixed direction of flight. Conventional control technology has untilized fixed fins and movable surfaces attached to the hull to accomplish these corrections. The disadvantage of such control elements is their relatively high weight and drag in calm weather. In the present invention, control thrusters which are located in the hull at a forward and aft station replace these fins and surfaces. For providing control moments, two thrusters are normally activated, one in the bow and one in the stern.

Stability of flight, in an airship requires almost continuous running at any given moment of at least two thrusters. The intensity or power level in calm weather is low, and the periodocity is intermittent. In increasingly turbulent weather, the periods of operation increase and lengthen and are maintained at higher energy levels. In highly turbulent weather, all thrusters are operated and run essentially continuously. The advantage of thrusters is that the total energy consumed is substantially lower than the total energy consumed by overcoming the drag of control surfaces and fins. Likewise, the weight of control thrusters and attendant electric power plant is lower than the combined weight of the fins and the control elements used with them.

BRIEF DESCRIPTION OF THE DRAWINGS

These and other advantages of the present invention will be better understood by reference to the drawings wherein:

FIG. 1 is a side elevation view of an airship equipped with thrusters according to the present invention;

FIG. 2A is a front elevation view of the airship of FIG. 1;

FIG. 2B is a stern elevation view of the airship of FIG. 1;

FIG. 3 is a detail view of the thruster and air intake arrangement in the bow of an airship;

FIG. 4 is a section view of a typical thruster used with the present invention;

FIG. 7 is a sectional view of a thruster in the bow of an airship; and

FIG. 8 is a sectional view of a thruster mounted in the stern of an airship.

DETAILED DESCRIPTION

Figure 5:
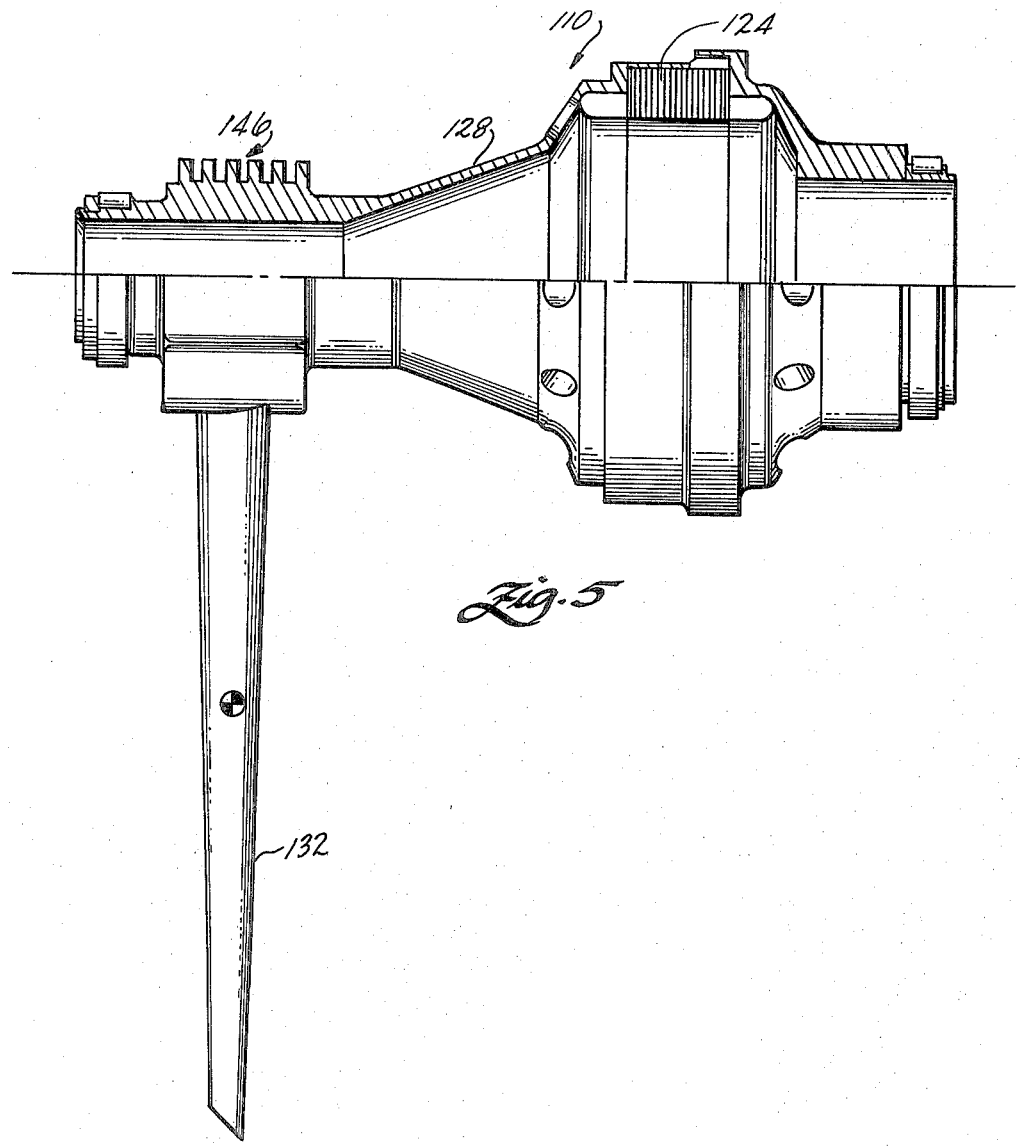
FIG. 5 is a sectional view of the first rotor of a thruster.

An airship 10 using the control thrusters of the present invention is shown in a side elevation view in FIG. 1. As shown therein, and as shown in FIGS. 2A and 2B, a total of eight thrusters are mounted in the bow, and a total of eight thrusters are mounted in the stern. In the bow, a pair of top thrusters 12 are directed upwardly, and a pair of bottom thrusters 14 are directed downwardly. A pair of port thrusters 16 are directed toward the left of the hull, and a pair of starboard thrusters 18 are directed to the right of the hull. Similarly, at the stern, a pair of top thrusters 20 are directed upwardly, and a pair of bottom thrusters 22 are directed downwardly. A pair of port thrusters 24 are directed to the left side of the hull, and a pair of starboard thrusters 26 are directed to the right of the hull.

As shown in the detailed elevational view of the bow in FIG. 3, the pair of bow port thrusters 16 are located on each side of the horizontal plane 28 dividing the airship 10 into upper and lower halves. An intake duct 30 provides the air entry for the uppermost of the two thrusters 16. Similarly, an air intake duct 32 provides the source of cold air for the lower of the two thrusters 16. Also shown in FIG. 3 is an air duct 34 associated with a top thruster 12 and a similar duct 36 associated with a bottom thruster 14. The air exit for the control jet of from thruster 12 is a tube 38 directed upwardly. Similarly, the air exit for the control jet of air from thruster 14 is a tube 40 directed downwardly. Tube 38 is supported by strut 42, while tube 40 is supported by strut 44 extending out from the hull. The construction of the other ducts at the bow and the stern of the airship are similar to that illustrated in FIG. 3.

The details of the flow path of air through the intake duct to a typical bow thruster and thence to the exit is shown in the detailed sectional elevation view shown in FIG. 7. As shown therein, a duct 37 communicates with a plenum chamber 46 in which is located the motor and propellers of a contra-rotating thruster 48. Thruster 48 includes a contra-rotating asynchronous electric motor 50 and mounted on a shaft extending from motor 50 is a first propeller 52 and a second propeller 54. Housing 58 supports motor 50 in an orientation as shown in FIG. 7 such that the control jet of air from thruster 48 is directed downwardly.

In operation an air mass 56 is drawn into the housing 58 by contra-rotating propellers 52 and 54 which each have three blades. Propeller 54 increases the air mass velocity to a high absolute value in the inter-propeller space between propellers 52 and 54. This increase in velocity is to a value that is greater than the velocity at the exit from the jet. The air then enters the space defined by propeller 54 which has the effect of reducing the final velocity of the air mass to the exit velocity, while at the same time increasing the sub-atmospheric pressure in the space between the two propellers back to the ambient pressure outside the hull.

Housing 58 comprises circular walls 62 connected by sloping radial bars 64. Walls 60 define a horn-like structure 66 in which the contra-rotating asynchronous electric motor 50 is mounted. The volumetric space surrounding motor 50 interiorly of horn 66 provides the avenue whereby cooling air 68 is drawn into the horn by the suction at the hub of propeller 52. The airstream 68 cools the motor interiorly and exteriorly. Propeller 52 is mounted on shaft 70, and propeller 54 is mounted on shaft 72 extending through and beyond the end of shaft 70. The propellers 52, 54 rotate in an exit duct 74, and the shafts are held in this space by radial rods 76 which mount the shafts. Mechanical forces exerted by the thrusters are resisted by radial bars 64, duct housing 74, and support column 78.

A detailed sectional view of the installation of a typical control thruster in the stern of the metal-clad airship shown in FIG. 8. A duct 80 provides the opening whereby air enters a chamber 82 for supplying air to the thruster. Thruster 81 is mounted in such a way as to be directed vertically upward and is supported by radial bars 84 attached to the sidewalls of an exit duct 86 which is defined by sloping walls 88. Thruster 81 comprises a contra-rotating asynchronous electric motor 90 supported within a horn-shaped housing 92. Extending from motor 90 is a shaft 94 and a second shaft 96 which extends through and beyond shaft 94. A propeller 98 is mounted on shaft 94, and a contra-rotating propeller 100 is mounted on shaft 96. An air mass 102 is drawn into and through the inter-propeller space between propellers 94 and 96 to provide the jet of air for obtaining the control function of thruster 81. In this case, when operated, thruster 81 exerts a force causing the stern of the airship to be deflected downwardly about an axis passing through the center of the airship perpendicularly to the longitudinal axis of the hull. Cooling air 104 is drawn into horn 92 to provide cooling for motor 90. As shown in FIG. 8, the thruster assembly is located inside a main frame member 106 which is described in greater detail in copending application, Ser. No. 932,221, filed Aug. 9, 1978.

Figure 6:
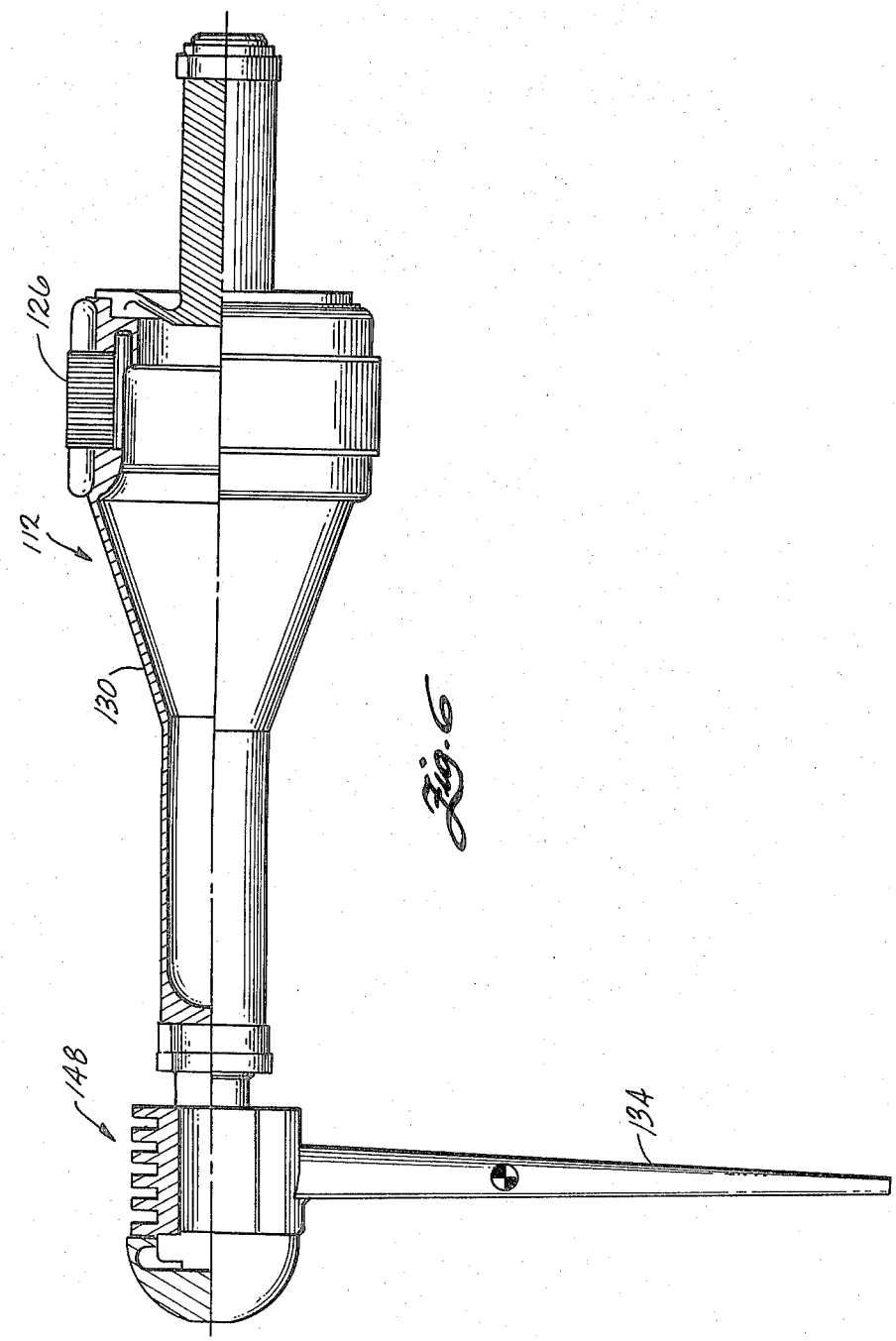
FIG. 6 is a sectional view of the second rotor of the thruster.

The mechanical and electrical structure of a control thruster of the present invention is shown in FIGS. 4, 5, and 6. As shown, the thruster comprises an electric motor 108 which has two contra-rotating rotors 110 and 112. In the presently preferred embodiment, rotors 110, 112 have a different number of poles with rotor 110 being provided with ten poles, while rotor 112 is provided with eight poles. This arrangement and numbering of poles is provided to cause the second rotor 112 to rotate faster. Electric power is supplied by means of cable 114 which is conducted through the stator 116 to brushes 118 which contact the inner diameter of rotor 110 and the outer diameter of rotor 112 through contact rings 120, 122, respectively.

Rings 120, 122 conduct electric current to armatures 124, 126, respectively, and each armature generates a rotating electromagnetic field having a mutually opposite direction of rotation. Armature 124 is mechanically linked to shaft 128, and likewise armature 126 is mechanically linked to shaft 130. When electric power is supplied to the motor, shafts 128, 130 rotate in opposite directions as do propellers 132 and 134, which are mechanically linked to shafts 128, 130, respectively. Rotors 110 and 112 turn on thrust radial bearings 136 and 138 at the motor end of the thruster. At the propeller end of the thruster, shafts 128, 130 are supported by axial bearings 140, 142, which are mounted in stator hub 144. Stator hub is, in turn, supported by rods 76.

The propeller blades 132, 134 are linked to the shafts by means of gashed rotor hubs 146, 148, and are each locked to their respective rotor hub by means of pins 150 which extend axially through the meshed teeth of the hub and the interior end of the propeller. The motor is cooled internally and externally by air 152 drawn in through aperture 154 by the low static pressure at the hub of propeller 132.

The control thrusters will run at windmilling speeds when no power is being supplied thereto. When used for control, the thrusters are accelerated, sometimes to full speed, by electric signals from sensing devices, such as accelerometers, on the airship, or by commands from the pilot's controls 156. The thrusters run on three-phase current of elevated frequency. In the preferred embodiment, and for best control capability, it is desirable to provide electronic control circuitry for energizing the rotors and also for modulating the frequency of the current driving them.

In addition to control thrusters, the present invention contemplates the provision of lifting thrusters of a similar design to assist the lift capabilities of airships. For example, in FIG. 1 is shown two lifting thrusters 152 and 154 which are located interiorly of the airship and directed downwardly. Air is taken into the thruster housing by means of ducts 156, 158. Although only a pair of lifting thrusters are shown in FIG. 1, it is contemplated that, in the normal embodiment of the airship of the present invention, at least one additional pair of lifting thrusters would be symmetrically located on the opposite side of the airship. Four lifting thrusters are illustrative only. The airship, according to the present invention, may be equipped with additional thrusters, normally in balanced pairs, to provide balanced lifting in supplementing the basic static lifting capabilities of the airship. Such lifting thrusters would typically be used in frieghter applications for the airships of the present invention. The purpose of such lifting thrusters is to provide sustained lift at the highest possible fuel efficiency. Because fuel efficiency is of such significance, in the presently preferred embodiment, lifting thrusters are driven directly by individual gas turbine engines 160, 162. It is anticipated that electrically driven thrusters using a power system similar to the electrical drive for the control thrusters described above can be substituted for turbine driven thrusters when high thermal efficiency power plants become available.

In the embodiment of FIG. 1, two lifting thrusters are permanently mounted in the hull bottom in the bow section and two in the stern section. All four thrusters are permanent components of the hull and are aimed downward. Air used by the thrusters is drawn in on the port and starboard sides for the purpose of negating inflow suction forces and is ducted to the thrusters through the bottom of a main frame. The main frame supports the thrusters and also distributes the forces from the thrusters into the hull shell.

In the preferred embodiment of the thruster of the present invention, the rotor shafts 128, 130 and the stator housing of the motor 108 are fabricated of titanium alloy, for example C-120AV. The gashed rotor hubs 146, 148 are hollow cylinders which are peripherially grooved. Into the peripherial grooves or recesses fit the roots of the propeller blades with matching internal ribs comprising the roots and pin holes aligned with the ribs and pin holes of the hub. Each blade has a root of a 120° segment with three pins 150 anchoring it to the hub.

The rotor shafts 128, 130 are cylindrical shells with the propellers 132, 134 at one end, and the electric armatures 124, 126 at the other end. The electric armatures 124, 126 are assembled of thin sheets (approximately 0.005-inch maximum thickness) of low hysteresis, non-oriented steel, varnish insulated and baked. The thin laminations or sheets are riveted together between thicker end laminations for containment. The windings are baked after insertion into the slots of the rotors, in vacuum, to form a firm assembly of all components bonded into a monolithic unit. All windings are taped and laced before varnishing and baked to eliminate all possibility of wire vibrations. The armatures are removable by sliding them axially from the rotor shells.

Ventilation of the rotors for cooling the armatures is accomplished by two streams of air which arrive from the surrounding space through aperture 154 in the stator housing. The air stream is then bifurcated into an external air stream in direct contact with the shell of rotor 110 and internal air stream entering into the inner rotor space through holes in rotor 110 and flowing toward the aerodynamic rotors thereby cooling rotor 112. Motion of the cooling air is derived by induction from the main stream of air.

The stator housing of the thruster is fabricated of aluminum alloy, for example 7050 or 7187 of approximately 0.064-inch thickness. Surface stabilizing stringers are connected to the stator housing to maintain it in its proper position. The thruster rotors are mounted in the exit ducts 74, 88 and are, in turn, supported by radially extending ribs or bars 64, 84.

What has been described is a control thruster for full, dependable, and effective control of the flight of an airship, such as a metal-clad airship, at all operating speeds from zero ground speed to maximum speed, and one which is capable of controlling the airship under all kinds of weather conditions. Both electric motors and gas turbines are suitable for acting as the power plant for such thrusters. When used for lift, such thrusters are capable of doubling the useful static lift of an airship hull.

What is claimed is:

1. A controllable airship having a large internal lifting gas space enclosed within the hull of the airship comprising:

an airship hull having a bow and a stern, said bow and stern having a bow chamber and a stern chamber respectively therein;

first thruster means located at the bow for influencing movements of the front end of the airship, said first thruster means being located internally of the hull of the airship;

first air intake means opening exteriorly of the hull for said first thruster means, said first intake means comprising an inlet to each of said first thruster means being located internally of the hull adjacent said first thruster means for communicating air thereto from said bow chamber without ducting through the lifting gas space and first air intake duct means adjacent said first thruster means for entrance of air into said bow chamber;

second thruster means located at the stern for influencing the movements of the rear end of the airship, said first and second thruster means each comprising a set of four perimetrally spaced-apart pairs of thrusters, each thruster being oriented so as to produce a controlled jet of air in a direction which is at an angle of 90° with respect to the direction of the controlled jet of air produced by adjacent thrusters, said second thruster means being located internally of the hull of the airship;

second air intake means opening exteriorly of the hull for said second thruster means, said second intake means comprising an inlet to each of said second thruster means being located internally of the hull adjacent said second thruster means for communicating air thereto from said stern chamber without ducting through the lifting gas space and second air intake duct means adjacent said second thruster means for entrance of air into said stern chamber; and control means connected between an operations control station and the first and second thruster means for controlling the operation of said thruster means.

2. An airship according to claim 1 wherein the thrusters of each pair of thrusters are located on opposite sides of a central plane bisecting the hull of the airship.

3. An airship according to claim 2 wherein the pairs of thrusters comprising the first thruster means are perimetrally spaced at 90° intervals around the hull and are located adjacent the bow of the airship with respective pairs of said thrusters being arranged so as to direct controlled jets of air upwardly, downwardly, and to each side of the airship.

4. An airship according to claim 3 wherein the pairs of thrusters comprising the second thruster means are perimetrally spaced at 90° intervals around the hull at a predetermined distance removed from the stern of the airship with respective pairs of said thrusters being arranged so as to direct controlled jets of air upwardly, downwardly, and to each side of the airship.

5. An airship according to claim 4 wherein the first and second air intake duct means includes an individual air intake duct associated with each individual thruster.

6. An airship according to claim 5 wherein the air intake ducts associated with said first thruster means are located between adjacent pairs of thrusters on the same peripheral line around the hull on which the first thruster means are located.

7. An airship according to claim 6 wherein the air intake ducts associated with said second thruster means are located on a peripheral line around the hull spaced interiorly of the thrusters relative to the stern of the airship.

8. An airship according to claim 1 including third thruster means located internally of and directed downwardly from the hull of the airship for providing added increments of lifting capability for the airship, said third thruster means being located intermediate the bow and the stern, and third air intake means for said third thruster means, said third intake means being located interiorly of the hull adjacent said third thruster means for communicating air thereto without ducting through the lifting gas space.

9. An airship according to claim 8 wherein the first, second and third thruster means are driven by motor means.

10. An airship according to claim 9 wherein the motor means are electric motors.

11. An airship according to claim 9 wherein the motor means are gas turbine engines.

12. A controllable airship comprising:

an airship hull having a bow and stern said bow and stern having a bow chamber and a stern chamber respectively therein;

a first set of four perimetrically spaced-apart pairs of thrusters located at the bow for influencing the movements of the front end of the airship, each pair of bow thrusters in said first set being oriented so as to produce a controlled jet of air in a direction which is at an angle of 90° with respect to the direction of the controlled jet of air produced by adjacent pairs of thrusters;

first air intake means for said first set of thrusters, said intake means comprising an inlet to each of said first thrusters being located internally of the hull adjacent said first set of thrusters for communicating air thereto from said bow chamber without ducting through the lifting gas space and a first air intake duct means located adjacent said first thrusters for entrance of air into said bow chambers;

a second set of four perimetrically spaced-apart pairs of thrusters located at the stern for influencing the movements of the rear end of the airship, each pair of stern thrusters in said second set being oriented so as to produce a controlled jet of air in a direction which is at an angle of 90° with respect to the direction of the controlled jet of air produced by adjacent pairs of thrusters;

second air intake means for said second set of thrusters, said second intake means comprising air inlet to each of said second thrusters being located internally of the hull adjacent said second set of thrusters for communicating air thereto from said stern chamber without ducting through the lifting gas space and second air intake duct means located adjacent said second thrusters; and control means connected between an operations control station and the first and second set of thrusters for contolling the operations of said thruster means.

13. A controllable airship comprising:

an airship hull having a bow and a stern said bow and stern having a bow chamber and a stern chamber respectively therein;

first thruster means located at the bow for influencing the movements of the front end of the airship;

second thruster mens located at the stern for influencing the movements of the rear end of the airship, said first and second thruster means each comprising a set of four pairs of perimetrically spaced-apart thrusters, each thruster pair being oriented so as to produce a controlled jet of air in a direction which is at an angle of 90° with respect to the direction of the controlled jet of air produced by adjacent thruster pairs;

first and second air intake means located at the bow and the stern respectively, each of said intake means comprising an inlet to each of said thrusters being located interiorly of the hull adjacent its associated first and second thruster means respectively, for communicating air thereto from said bow chamber and stern chamber respectively without ducting through the lifting gas space and first and second air intake duct means adjacent said first and second thruster means respectively for entrance of air into said bow chamber and said stern chamber respectively; and control means connected between an operations control station and the first and second thruster means for controlling the operation of said thruster means.

* * * * *